US011121909B2

(12) United States Patent
Gupta et al.

(10) Patent No.: US 11,121,909 B2
(45) Date of Patent: Sep. 14, 2021

(54) DETECTING AND DIAGNOSING CALL QUALITY DEGRADATION ISSUES USING DATA SESSION RECORD DATA

(71) Applicant: International Business Machines Corporation, Armonk, NY (US)

(72) Inventors: Parul Gupta, Bangalore (IN); Shivkumar Kalyanaraman, Bangalore (IN); Bong Jun Ko, Harrington Park, NJ (US); Vinay Kumar Kolar, Bangalore (IN); Ravi Kothari, Bangalore (IN); Kang-Won Lee, Seoul (KR); Ramya Raghavendra, New York, NY (US); Dinesh C. Verma, New Castle, NY (US); Petros Zerfos, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/381,227

(22) Filed: Apr. 11, 2019

(65) Prior Publication Data

US 2020/0328934 A1    Oct. 15, 2020

(51) Int. Cl.
| | | |
|---|---|---|
| *H04L 12/24* | (2006.01) | |
| *H04M 3/22* | (2006.01) | |
| *H04L 29/06* | (2006.01) | |
| *H04L 29/14* | (2006.01) | |

(52) U.S. Cl.
CPC ............ *H04L 41/065* (2013.01); *H04L 29/14* (2013.01); *H04L 65/80* (2013.01); *H04L 69/40* (2013.01); *H04M 3/2218* (2013.01)

(58) Field of Classification Search
CPC ....... H04L 41/065; H04L 29/14; H04L 65/80; H04L 69/40
See application file for complete search history.

(56) References Cited

U.S. PATENT DOCUMENTS

| | | | |
|---|---|---|---|
| 7,420,927 B1 | 9/2008 | Garakani et al. | |
| 8,077,675 B2 | 12/2011 | Stephenson et al. | |
| 8,503,313 B1 * | 8/2013 | Lang | H04L 65/80 |
| | | | 370/252 |
| 10,467,193 B1 * | 11/2019 | Senra | G06F 16/219 |

(Continued)

FOREIGN PATENT DOCUMENTS

| | | |
|---|---|---|
| TW | 201014220 A | 4/2010 |
| WO | 2010052695 A1 | 5/2010 |

OTHER PUBLICATIONS

Ficek, M. et al., "Inter-Call Mobility model: A spatio-temporal refinement of Call Data Records using a Gaussian mixture model", 2012, pp. 469-477, INFOCOM, 2012 Proceedings IEEE, Digital Object Identifier: 10.1109/ INFCOM.2012.6195786.

*Primary Examiner* — Jason D Recek
(74) *Attorney, Agent, or Firm* — Cantor Colburn LLP; Vazken Alexanian

(57) ABSTRACT

A computer-implemented method includes: receiving, using a processor, multiple data session records (DSRs); storing the multiple DSRs in a memory communicatively coupled to the processor; analyzing, using the processor, the stored multiple DSRs for temporal and spatial data; and determining, using the processor, quality degradation by using the temporal and spatial data for the stored multiple DSRs.

14 Claims, 8 Drawing Sheets

(56) References Cited

U.S. PATENT DOCUMENTS

| | | | |
|---|---|---|---|
| 2003/0185363 A1* | 10/2003 | Cerami | H04M 15/41 |
| | | | 379/126 |
| 2005/0226400 A1 | 10/2005 | Farber et al. | |
| 2007/0010239 A1* | 1/2007 | Connelly | H04M 15/00 |
| | | | 455/423 |
| 2009/0304165 A1 | 12/2009 | Chung et al. | |
| 2011/0137772 A1 | 6/2011 | Davis, III et al. | |
| 2012/0278476 A1 | 11/2012 | Agrawal et al. | |
| 2012/0282888 A1 | 11/2012 | Frias Martinez et al. | |
| 2016/0205511 A1* | 7/2016 | Schuler | H04W 4/029 |
| | | | 455/456.1 |
| 2020/0022002 A1* | 1/2020 | Karanam | H04W 24/02 |

* cited by examiner

DETECTING AND DIAGNOSING CALL QUALITY DEGRADATION ISSUES USING DATA SESSION RECORD DATA

BACKGROUND

The present invention relates in general to network communications systems, and more specifically, to network communications systems configured and arranged to detect and diagnose quality degradation issues in the network using data session record data.

A data session record is a set of data about a data session conducted by a network. An example of a data session is when, for example, a mobile smartphone accesses the internet over a WiFi network connection. The data session is initiated when the internet access is established, and the data session is terminated when the internet access is interrupted or otherwise terminated. A wide variety of data about the data session is accumulated by the network and stored in the data session record as long as the data session is maintained. The data stored in the data session record can include a wide variety of details about the nature, location and duration of the data session.

An example of a data session record (DSR) is known generally as a call detail record (CDR), which is a data record produced by a telecommunications network that documents the details of a telecommunications transaction (e.g., a phone call, a text message, mobile internet access, and the like) that passes through the network to and from a telecommunications transceiver (e.g., a smartphone). The CDR is initiated when the telecommunications transaction is established, and the CDR is terminated when the telecommunications transaction is interrupted or otherwise terminated. The CDR contains various attributes of an individual telecommunications transaction such as time, duration, completion status, source number, and destination number. Thus, information that populates a CDR is generated through the usage and physical movement of telecommunications transceivers in a network.

SUMMARY

According to embodiments of the present invention, a computer-implemented method includes: receiving, using a processor, multiple data session records (DSRs); storing the multiple DSRs in a memory communicatively coupled to the processor; analyzing, using the processor, the stored multiple DSRs for temporal and spatial data; and determining, using the processor, quality degradation by using the temporal and spatial data for the stored multiple DSRs.

According to another embodiment of the present invention, a system including one or more processors, one or more computer-readable memories and one or more computer-readable, tangible storage devices; a receiving module operatively coupled to at least one of the one or more storage devices for execution by at least one of the one or more processors via at least one of the one or more memories, configured to receive multiple data session records (DSRs); a storage module operatively coupled to at least one of the one or more storage devices for execution by at least one of the one or more processors via at least one of the one or more memories, configured to store the multiple DSRs in a memory communicatively coupled to at least one processor; an analyzing module operatively coupled to at least one of the one or more storage devices for execution by at least one of the one or more processors via at least one of the one or more memories, configured to analyze the stored multiple DSRs for temporal and spatial data; and a determining module operatively coupled to at least one of the one or more storage devices for execution by at least one of the one or more processors via at least one of the one or more memories, configured to determine quality degradation by using the temporal and spatial data for the stored multiple DSR's.

According to yet another embodiment of the present invention, a computer program product including: one or more computer-readable storage medium, wherein the computer readable storage medium is not a transitory signal per se; program instructions, stored on at least one of the one or more storage medium, to receive multiple data session records (DSRs); program instructions, stored on at least one of the one or more storage medium, to store the multiple DSRs in a memory communicatively coupled to a processor; program instructions, stored on at least one of the one or more storage medium, to analyze the stored multiple DSRs for temporal and spatial data; and program instructions, stored on at least one of the one or more storage medium, to determine quality degradation by using the temporal and spatial data for the stored multiple DSR's.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
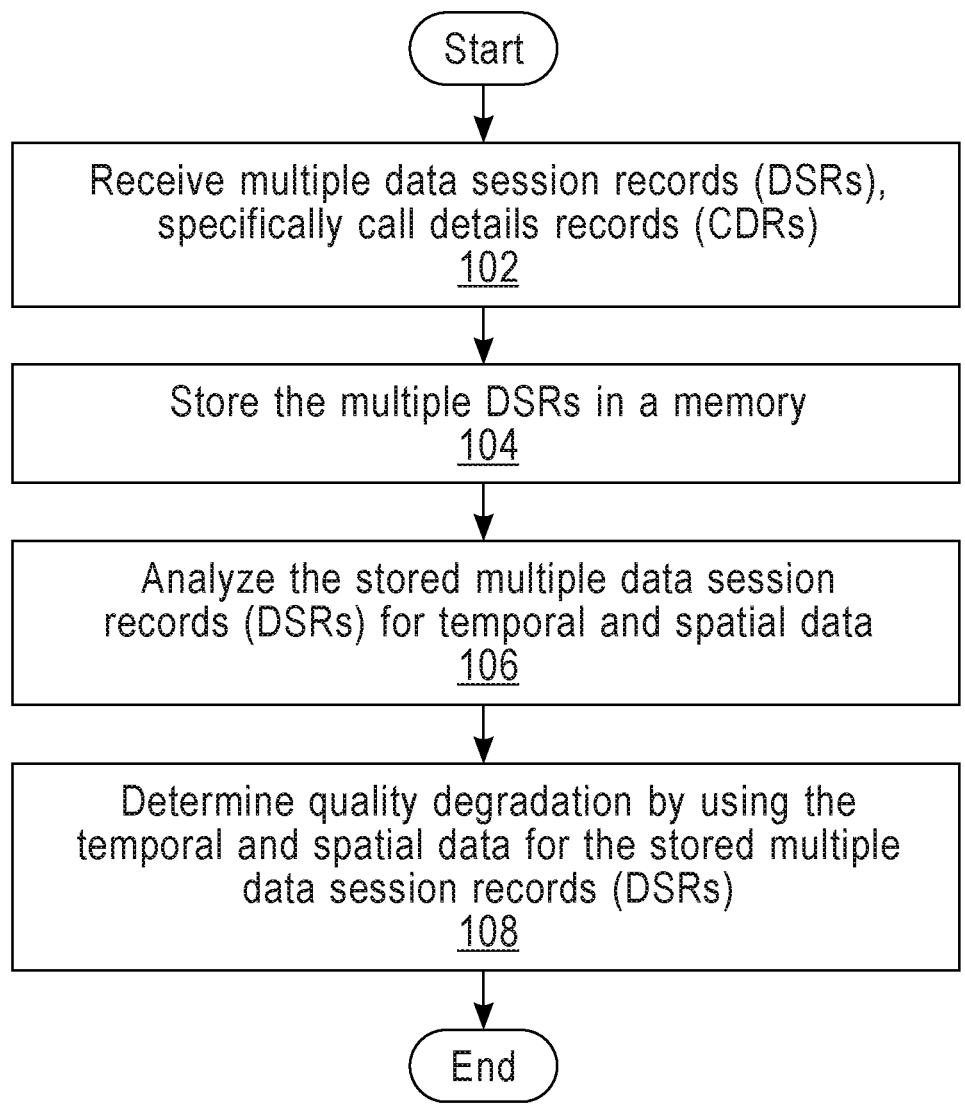
FIG. 1 illustrates a flow diagram of a process for detecting and diagnosing quality degradation issues using CDR data in accordance with one or more embodiments of the present invention.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Aspects of the invention are not limited in their application to the details of construction and the arrangement of the components set forth in the following description or illustrated in the drawings. The embodiments of the invention described herein are applicable to other embodiments or are capable of being practiced or carried out in various ways. The phraseology and terminology employed herein are for the purpose of description and should not be regarded as limiting. As will be appreciated by one skilled in the art, aspects of the present invention can be embodied as a system, method or computer program product.

In a telecommunications network (e.g., a wireless cellular network), customer-impacting problems in the network are typically identified and diagnosed through the monitoring and diagnosis results reported by network elements such as a radio network controller (RNC), a SGSN (Serving GPRS Support Node), and a GGSN (Gateway GPRS Support Node). The problems that can be identified by network elements are typically those that can be directly observed such as call attempt failures, dropped calls, data session establishment failures, and the like. In many cases, the problems impacting a customer's experience with the network connection go unnoticed by the network elements, because the problem only involves, for example, quality of experience degradations that are not recorded by network element systems. For example, in a region that consists of 3G-capable cell sites and 2G-only cell sites, a mobile customer conducting an active telecommunications transaction (e.g., mobile internet access) can experience a sudden increase in the latency when the customer moves from 3G cells into 2G cells, and this degradation would not be detected by the above-described network elements because the degradation is not indicative of any of the problems in the network. Such situations impact many customers and hence require attentions by network operators, yet they are difficult to identify because of their implicit nature.

Turning now to an overview of aspects of the invention, embodiments of the invention provide computing devices, computer-implemented methods, and computer program products configured and arranged to identify and diagnose network quality degradation issues that are not detected by network elements. In embodiments of the invention, network quality degradation issues are detected and diagnosed using computing devices, computer-implemented methods, and computer program products configured and arranged to analyze CDR data. Embodiments of the invention address the issue by collectively aggregating CDRs, and analyzing the temporal and spatial correlation of multiple CDRs to detect the call quality issues and the network elements that are the likely sources of the issues. Although some examples and explanations provided herein are in the context of phone call data session, these phone call data session examples apply equally to network data sessions that do not involve a phone call, including, for example, an attempt to access the internet through the network.

As a non-limiting example, CDRs can contain, caller identifiers, called identifiers (in voice call), location(s) at which the call is made (or originated, or received), network elements that handled the call (base station, MSC, SGSN, GGSN, etc.), timestamp data identifying when the call was made, duration of the call, data volume (in data connection), service identifier (in data connection, e.g., URL), reason for termination, and many other fields related to billing. CDRs are generated by network elements (MSC, SGSN, GGSN, etc.) and periodically exported to IT equipment (e.g., billing server, analytics server).

Embodiments of the invention address the problem of identifying the regions of degraded network connection quality in the cellular networks by analyzing the call details records (CDR) data. It makes use of temporal and spatial correlations of the CDRs to detect the call quality degradation and their likely sources among the network elements. From the temporal correlation of CDRs, the quality degradation experienced by individual users is inferred and identified through the analysis of the CDR data across multiple CDRs that indicate the repeated attempts for calls (or data sessions) to the same destination by the users. Embodiments of the invention utilize the topological and spatial correlation across CDRs for multiple users to identify the likely source of call quality degradations of those users among the network elements in the cellular networks.

Turning now to a more detailed description of aspects of the invention, FIG. 1 depicts a flow diagram of a process for detecting and diagnosing quality degradation issues using CDR data according embodiments of the present invention. The process starts by receiving multiple data session records (DSRs), specifically call details records (CDR) data from users placing calls within a network 102. The process then stores the multiple DSRs in a memory 104. The process then analyzes the stored multiple data session records (DSRs) for temporal and spatial data 106. The process then determines call quality degradation by using the temporal and spatial for the stored multiple data session records (DSRs). Call quality degradation may be the result of repeated call attempts or network equipment failure.

Figure 2:
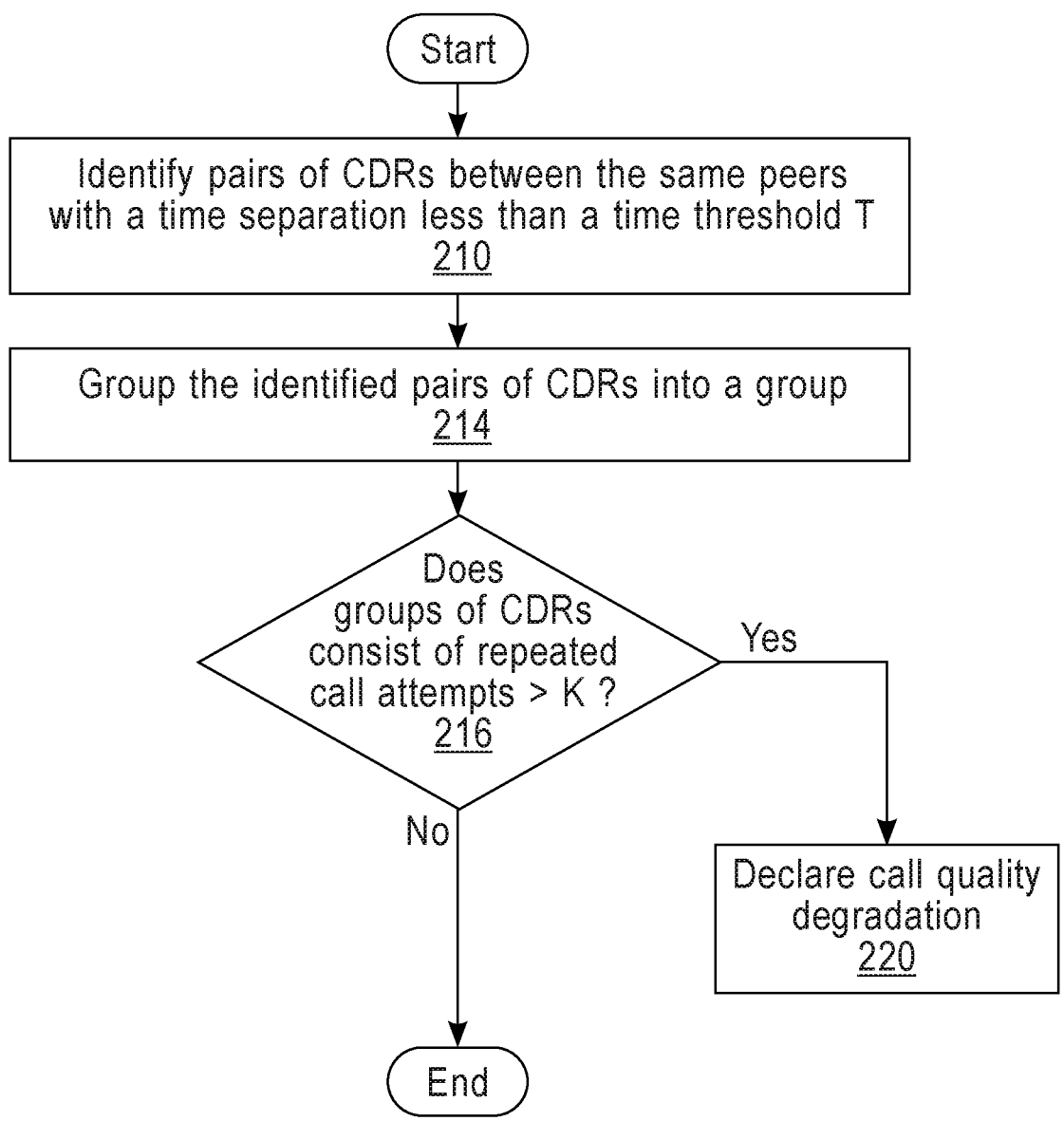
FIG. 2 illustrates a flow diagram of a process for detecting and diagnosing quality degradation issues using CDR data in accordance with one or more embodiments of the present invention.

Referring to FIG. 2, a flow diagram of a process for detecting and diagnosing quality degradation issues using call details record data according embodiments of the present invention. The first step of detecting the call quality issue of individual users is to use the temporal correlation of multiple CDRs for each user. It works by identifying a series of pairs CDRs that record the calls or data sessions between the same peers (e.g., between the same phone numbers, or attempts to connect to the same URL) and are separated in time less than some time threshold T between successive calls 210. The process then groups the identified pairs of CDRs into a group 214 that we call a 'conversation'. If the number of CDRs in a conversation consisting of repeated call attempts is larger than a threshold K 216 (a typical number of K could be set to 3, for example), the process declares a possible case of call quality degradation 220.

Some information directly accessible in the individual CDRs is also used to further increase the accuracy of the detection of the quality degradation via a group of CDRs of repeated call attempts. In embodiments of the invention, the "termination code" and/or "termination reason" of individual CDRs are used to determine whether the repeated call attempts are due to quality degradation issue or not. For example, if the call termination code in the CDR is "user busy", "user not responding", or "call waiting time-out", the repeated attempts to call do not mean a degraded quality. Similarly, a user accessing a single URL is split into multiple data session by the device and network, and hence recorded as repeated attempts in CDR data, if the user's data session has exceeded time limit or volume limit set by the network. Repeated attempts due to such reason (recorded as "partial CDR") shall not be treated as a case of quality degradation.

The groups of CDRs indicating call quality degradation from multiple users can be analyzed to further diagnose the issue. In one embodiment, the number and the spatial distribution of the users experiencing the call quality degradation issue, detected by the temporal correlation of repeated call attempts, are used to determine whether the issue is originated from a device problem or network problem. For example, if a single user accessing a URL experiences the degradation, it indicates the issue is due to the device problem, but if multiple users are experiencing the problems, i.e., each attempting a session to some destination, then it is more likely that there is degradation in some of the network elements. Also, if the problematic CDRs are correlated spatially, i.e., the users in the same cell tower or in the same geographic regions are showing symptoms of the quality degradation, the source of the problem is narrowed down to the network element placed at the location of those users. But if the problematic CDRs are not spatially correlated, it is diagnosed that the problem lies higher up in the network hierarchy. For example, if multiple users accessing the same URL, but not geographically correlated and experience the quality degradation, the problem likely lies in the server or external network that provides the service for that URL.

Figure 3A:
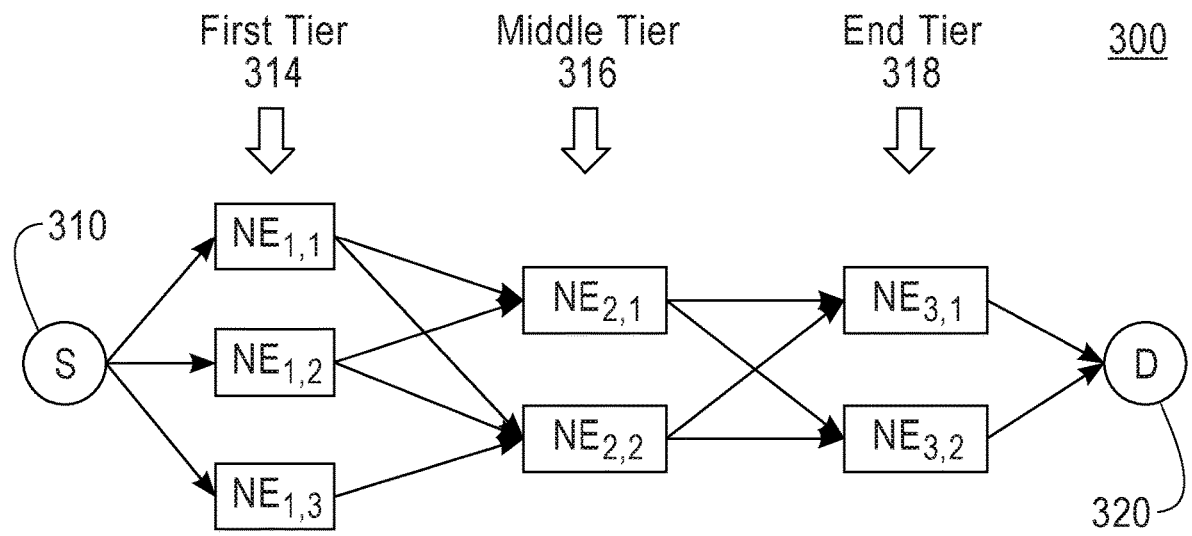
FIG. 3A illustrates a block diagram of components of a system for detecting and diagnosing quality degradation issues using CDR data in accordance with one or more embodiments of the present invention.
Figure 3B:
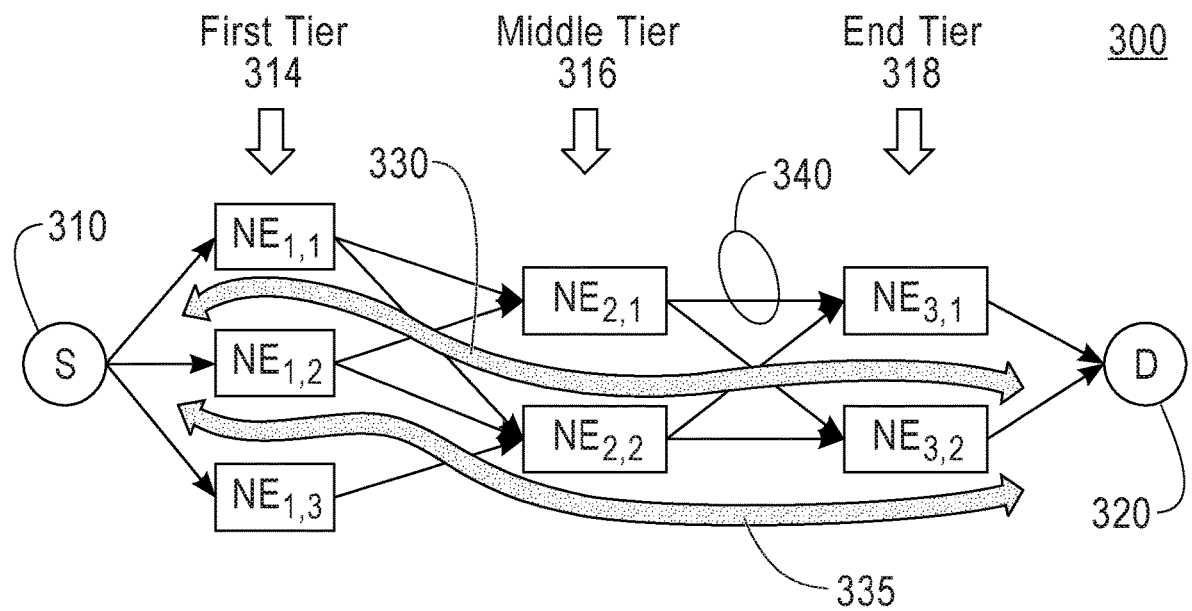
FIG. 3B illustrates a block diagram of components of a system for detecting and diagnosing quality degradation issues using CDR data in accordance with one or more embodiments of the present invention.

Referring to FIGS. 3A and 3B, illustrate block diagrams of components of a system for detecting and diagnosing quality degradation issues using call details record data in accordance with one or more embodiments of the present invention. The diagnosis of the call quality degradation issue can be further refined by correlating the problematic CDRs based on the topology 300 of those network elements that the call recorded by individual CDRs have gone through. A data-session CDR indicates the path from users S 310 to first tier 314 base-station ($NE_{1,x}$) to middle tier 316 SGSN ($NE_{2,x}$) to end tier 318 GGSN ($NE_{3,x}$) and to destination/URL D 320. In a voice call, the sequence of network elements can be base-station and MSC.

As an example, suppose there are 4 CDR groups to the same destination URL a first CDR equipment grouping connecting a caller S to a destination D includes the following S, $NE_{1,1}$, $NE_{2,1}$, $NE_{3,1}$, D→Call quality degradation. A second CDR equipment grouping includes S, $NE_{1,1}$, $NE_{2,2}$, $NE_{3,1}$, D→No call quality degradation. A third CDR equipment grouping includes S, $NE_{1,2}$, $NE_{2,1}$, $NE_{3,2}$, D→No call quality degradation. Another possible CDR equipment grouping includes still another connection S, $NE_{1,1}$ $NE_{2,2}$, $NE_{3,2}$, D→No call quality degradation. From the CDRs, the problematic call quality degradation observed in CDR Group 1 is isolated to the link 340 between $NE_{2,2}$ and $NE_{3,1}$. However paths 330 and 335 indicate no call quality degradation.

Figure 4:
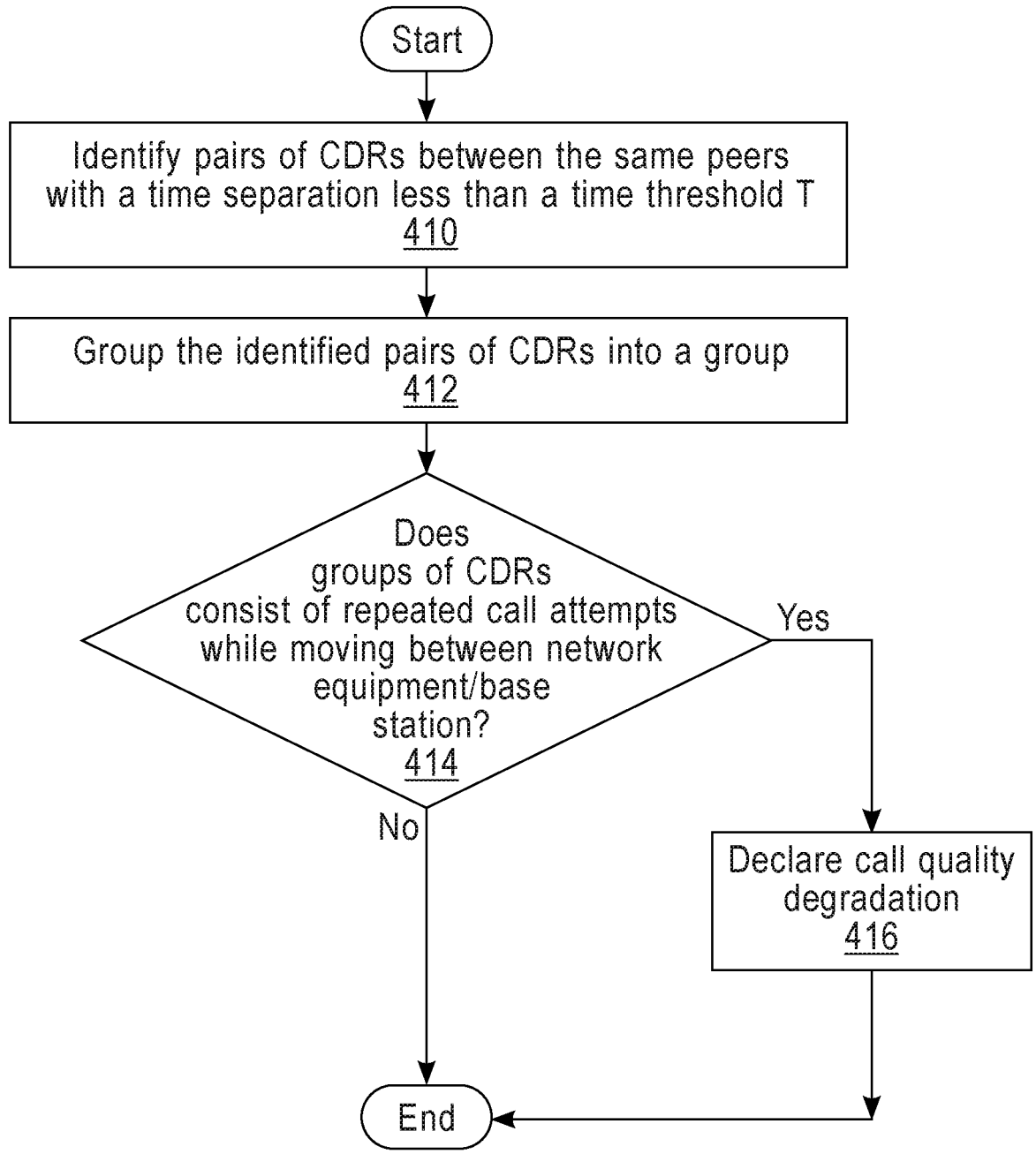
FIG. 4 illustrates a flow diagram of a process for detecting and diagnosing quality degradation issues using CDR data in accordance with one or more embodiments of the present invention.

Referring to FIG. 4, a flow diagram of a process for detecting and diagnosing quality degradation issues using call details record data according embodiments of the present invention. The first step of detecting the call quality issue of individual users is to use the temporal correlation of multiple CDRs for each user. It works by identifying a series of pairs CDRs that record the calls or data sessions between the same peers (e.g., between the same phone numbers, or attempts to connect to the same URL) and are separated in time less than some time threshold T between successive calls 410. The process then groups the identified pairs of CDRs into a group 412 that we call a 'conversation'. Users' mobility information recorded in CDRs is used to further characterize the quality degradation issue. For example, if a group of repeated call attempts is originated or terminated from a single base station, it is likely to be a coverage issue of that particular base station. On the other hand, if the repeated attempts are made while the user is moving between different base station (indicated by different base station identity in the CDRs) 414, then it is diagnosed as a call quality degradation issue 416. The degradation may be a signaling issue during hand-over, a capacity planning issue, or a black spot, depending on the termination code.

The grouping of CDRs can be carried out in a variety of ways. In embodiments of the invention, a CDR group of repeated call attempts is generated from the CDRs generated in a single cell site. This is useful when a more accurate spatial analysis of the CDRs is required. In another embodiment, a CDR group of repeated call attempts is generated from the CDRs associated with multiple cell sites. This is useful when a more accurate temporal analysis of the CDRs is required, i.e., to improve the accuracy of the detection of call quality degradation from a large number of the repeated call attempts. In yet another embodiment, the spatial analysis of the CDRs utilizes the inference of the missing information about the cell sites for spatial analysis, by interpolating and/or extrapolating the cell site information that is contained in a CDR group. For example, if a CDR group contains some CDRs associated with a cell site A, and some other associated with a cell site B, but not a cell site C that is located in between cell site A and cell site B, then it is inferred that the user experienced the call quality degradation in cell site C as well.

Figure 5:
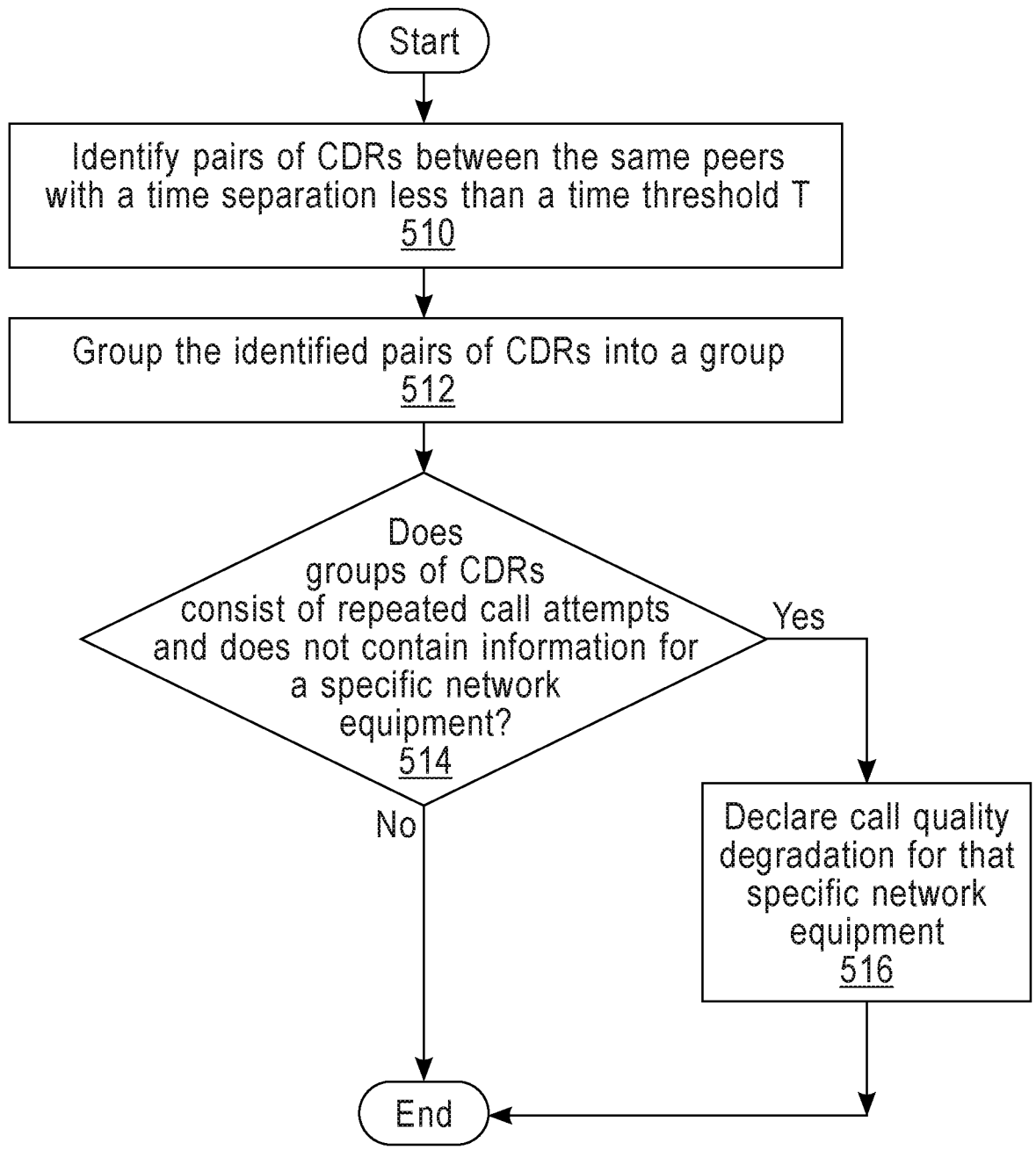
FIG. 5 illustrates a flow diagram of a process for detecting and diagnosing quality degradation issues using CDR data in accordance with one or more embodiments of the present invention.

Referring to FIG. 5, a flow diagram of a process for detecting and diagnosing quality degradation issues using call details record data according embodiments of the present invention. The first step of detecting the call quality issue of individual users is to use the temporal correlation of multiple CDRs for each user. It works by identifying a series of pairs CDRs that record the calls or data sessions between the same peers (e.g., between the same phone numbers, or attempts to connect to the same URL) and are separated in time less than some time threshold T between successive calls 510. The process then groups the identified pairs of CDRs into a group 512 that we call a 'conversation'. Users' mobility information recorded in CDRs is used to further characterize the quality degradation issue. For example, if a group of CDRs consist of (or represent) repeated call attempts and does not contain information for a specific network equipment then it is diagnosed as a call quality degradation issue for that specific network equipment 516.

In another embodiment, the call quality degradation identified by analyzing CDRs are used to assess the quality of the network elements by "scoring" different network elements, where network elements with high-scores can be used to narrow down on the source of inefficiencies in the network. Network elements can be scored by identifying CDRs belonging to the same session (as discussed). For each of the session, we score the network elements involved in the session according to multiple reasons for call success or failure seen in the CDR set. For example, if a group of CDRs are terminated due to "network congestion" and there were a large number of call initiation attempts by the user, then we will assign a high "frustrated customer" score. Other multi-objective-based weights can be used to assign scores to different type of user experiences. An example of other score is "quality of conversation" metric which can be assigned by combining the fact that multiple, repeated attempts to call were made, with how long the user session was active. Hence, at the end of this stage, each network element will have a set of scores that indicate how much a specific network element contributed to an attribute of call quality (such as user frustration or conversation quality). We call this a "vector of scores" for the network element. The score vectors are updated as the conversations flow into the system.

Figure 6:
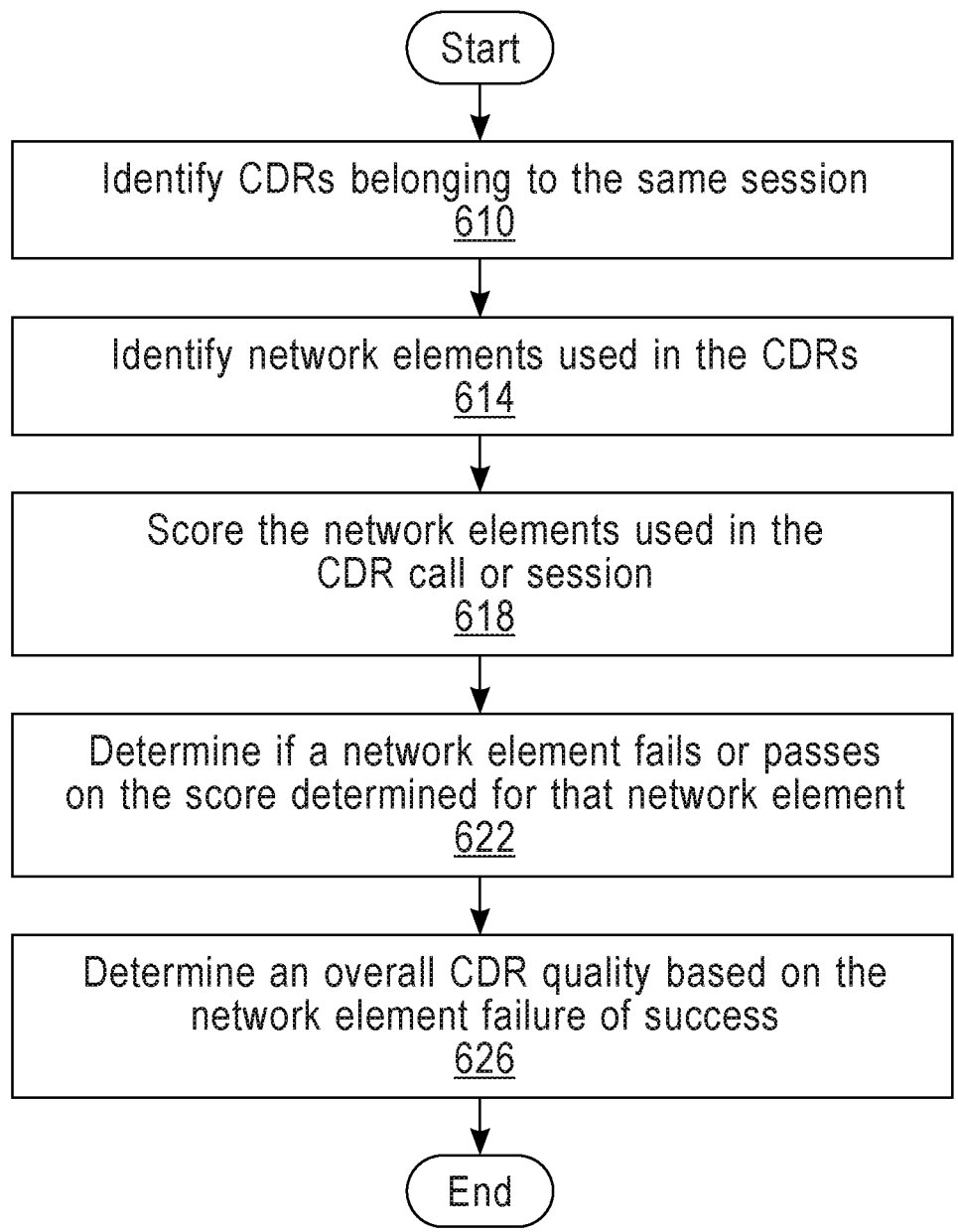
FIG. 6 illustrates a flow diagram of a process for detecting and diagnosing quality degradation issues using CDR data in accordance with one or more embodiments of the present invention.
Figure 7:
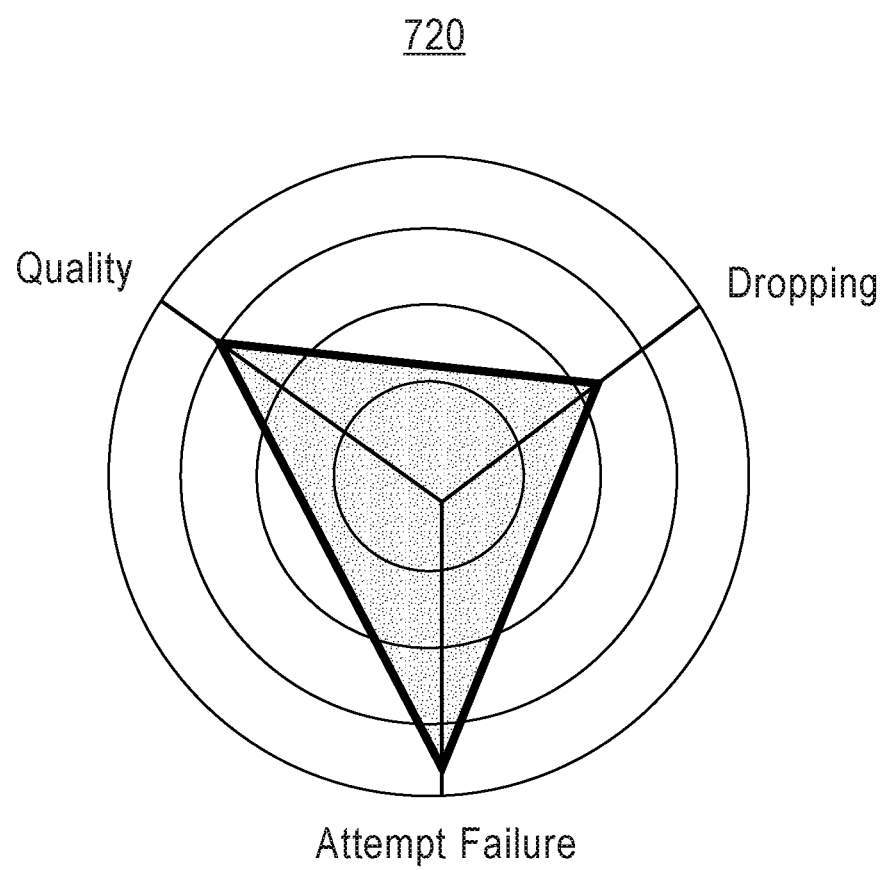
FIG. 7 illustrates a scoring diagram of a process for detecting and diagnosing quality degradation issues using CDR data in accordance with one or more embodiments of the present invention.

FIG. 6 illustrates a flow diagram of a process for detecting and diagnosing quality degradation issues using CDR data in accordance with one or more embodiments of the present invention, and FIG. 7 illustrates a scoring diagram of a process for detecting and diagnosing quality degradation issues using CDR data in accordance with one or more embodiments of the present invention. Referring first to FIG. 6, a flow diagram of a process for detecting and diagnosing quality degradation issues using CDR data according embodiments of the present invention identifies CDRs belonging to the same session 610. Each of the network elements/equipment used in the CDRs is identified 614. Each of the identified network elements/equipment used in the CDR call or session is scored 618. The process determines if a network element fails or passes based on the score determined for that network element/equipment 622. The process then determines an overall CDR quality based on the network element failure or success 626.

Referring not to FIG. 7, based on the vector of scores 720, top-k network elements in multiple dimensions can be picked. For example, the operator may be presented a "slider" (which can be moved to adjust different weights) for each score. Based on the weights assigned to different scores, we can present a set of top-k network elements that have high scores. This allows the analyst to identify the top few network elements that are involved in frequent call quality degradation instances. Operators can then choose to act to improve network performance by further analyzing, upgrading or replacing those network elements.

Figure 8:
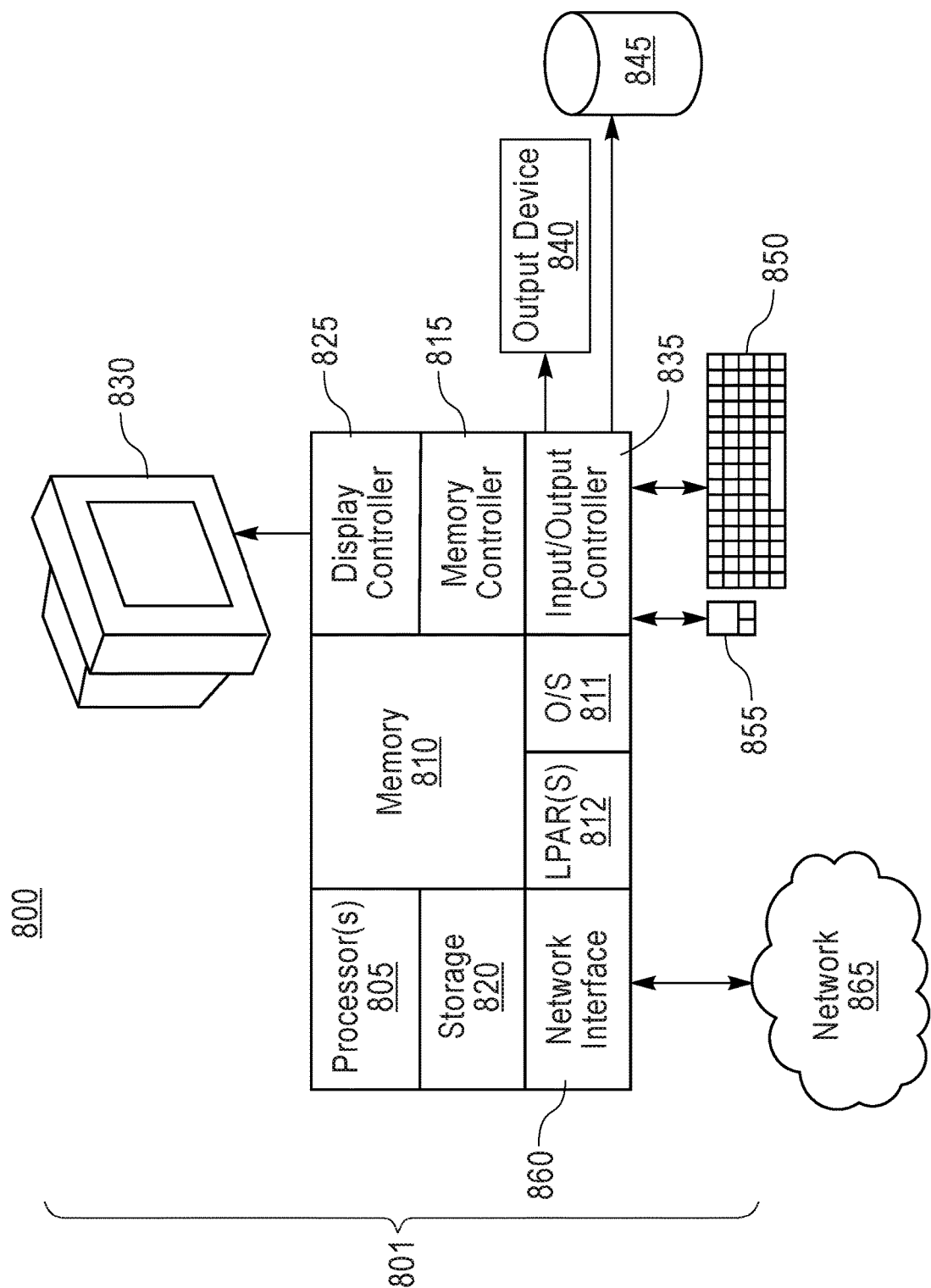
FIG. 8 illustrates a computer system for detecting and diagnosing quality degradation issues using CDR data in accordance with one or more embodiments of the present invention.

Turning now to FIG. 8, a computer system 800 for determining data placement on storage devices is generally shown in accordance with one or more embodiments of the present invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 800 therefore may include general-purpose computer or mainframe 801 capable of running multiple instances of an O/S simultaneously.

In an exemplary embodiment, in terms of hardware architecture, as shown in FIG. 8, the computer 801 includes one or more processors 805, memory 810 coupled to a memory controller 815, and one or more input and/or output (I/O) devices 840, 845 (or peripherals) that are communicatively coupled via a local input/output controller 835. The input/output controller 835 can be, for example but not limited to, one or more buses or other wired or wireless connections, as is known in the art. The input/output controller 835 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 835 may include a plurality of sub-channels configured to access the output devices 840 and 845. The sub-channels may include fiber-optic communications ports.

The processor 805 is a hardware device for executing software, particularly that stored in storage 820, such as cache storage, or memory 810. The processor 805 can be any custom made or commercially available processor, a central processing unit (CPU), an auxiliary processor among several processors associated with the computer 801, a semiconductor based microprocessor (in the form of a microchip or chip set), a macroprocessor, or generally any device for executing instructions.

The memory 810 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 810 may incorporate electronic, magnetic, optical, and/or other types of storage media. Note that the memory 810 can have a distributed architecture, where various components are situated remote from one another, but can be accessed by the processor 805.

The instructions in memory 810 may include one or more separate programs, each of which comprises an ordered listing of executable instructions for implementing logical functions. In the example of FIG. 8, the instructions in the memory 810 a suitable operating system (OS) 811. The operating system 811 essentially controls the execution of other computer programs and provides scheduling, input-output control, file and data management, memory management, and communication control and related services.

The memory 810 may include multiple logical partitions (LPARs) 812, each running an instance of an operating system. The LPARs 812 may be managed by a hypervisor, which may be a program stored in memory 810 and executed by the processor 805.

In an exemplary embodiment, a conventional keyboard 850 and mouse 855 can be coupled to the input/output controller 835. Other output devices such as the I/O devices 840, 845 may include input devices, for example but not limited to a printer, a scanner, microphone, and the like. Finally, the I/O devices 840, 845 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 800 can further include a display controller 825 coupled to a display 830. In an exemplary embodiment, the system 800 can further include a network interface 860 for coupling to a network 865. The network 865 can be an IP-based network for communication between the computer 801 and any external server, client and the like via a broadband connection. The network 865 transmits and receives data between the computer 801 and external systems. In an exemplary embodiment, network 865 can be a managed IP network administered by a service provider. The network 865 may be implemented in a wireless fashion, e.g., using wireless protocols and technologies, such as WiFi, WiMax, etc. The network 865 can also be a packet-switched network such as a local area network, wide area network, metropolitan area network, Internet network, or other similar type of network environment. The network 865 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 801 is a PC, workstation, intelligent device or the like, the instructions in the memory 810 may further include a basic input output system (BIOS) (omitted for simplicity). The BIOS is a set of essential software routines that initialize and test hardware at startup, start the OS 811, and support the transfer of data among the hardware devices. The BIOS is stored in ROM so that the BIOS can be executed when the computer 801 is activated.

When the computer 801 is in operation, the processor 805 is configured to execute instructions stored within the memory 810, to communicate data to and from the memory 810, and to generally control operations of the computer 801 pursuant to the instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for diagnosing call quality degradation in a cellular network, the method comprising:
    identifying regions of degraded network connection quality in the cellular network by:
        receiving, using a processor, multiple data session records (DSRs), each DSR being an electronic data record comprising details of a telecommunications transaction on the cellular network;
        identifying, using the processor, by analyzing the multiple DSRs for temporal and spatial data, a group of DSRs for different users having a common attribute, the common attribute of the group of DSRs being selected from the group consisting of repeated call attempts and accessing a same URL via the cellular network, the analyzing the multiple DSRs comprising:
            determining that the group of DSRs is further identified based on being associated with a common cell site according to the spatial data such that a quality degradation is determined to be at a location of the common cell site in response to the common attribute being the repeated call attempts, wherein at least a pair of DSRs from the group of DSRs has a time separation that is less than a predetermined threshold; and
            determining that the group of DSRs is not geographically correlated for the different users experiencing issues accessing the same URL such that the quality degradation is determined to be external to the cellular network in response to the common attribute being accessing the same URL; and
        determining, using the processor, the quality degradation in the cellular network if the number of DSRs in the group of DSRs is greater than a predetermined number K.

2. The computer-implemented method according to claim 1, wherein the multiple DSRs comprise multiple call details records (CDRs).

3. The computer-implemented method according to claim 1, wherein determining the quality degradation includes assessing if the group of DSRs represents the repeated call attempts while moving between network equipment.

4. The computer-implemented method according to claim 1, wherein determining the quality degradation includes assessing if the group of DSRs represents the repeated call attempts and does not contain information for a specific network equipment.

5. The computer-implemented method according to claim 1 further comprising determining call quality degradation by diagnosing network equipment failure.

6. A system comprising:
    one or more processors, one or more computer-readable memories and one or more computer-readable, tangible storage devices, wherein the one or more processors are configured to perform a method for diagnosing call quality degradation in a cellular network, the method comprising:
    receiving multiple data session records (DSRs), each DSR being an electronic data record comprising details of a telecommunications transaction on the cellular network;
    identifying, by analyzing the multiple DSRs for temporal and spatial data, a group of DSRs for different users having a common attribute, the common attribute of the group of DSRs being selected from the group consisting of repeated call attempts and accessing a same URL via the cellular network, the analyzing the multiple DSRs comprising:
        determining that the group of DSRs is further identified based on being associated with a common cell site according to the spatial data such that a quality degradation is determined to be at a location of the common cell site in response to the common attribute being the repeated call attempts, wherein at least a pair of DSRs from the group of DSRs has a time separation that is less than a predetermined threshold; and
        determining that the group of DSRs is not geographically correlated for the different users experiencing issues accessing the same URL such that the quality degradation is determined to be external to the cellular network in response to the common attribute being accessing the same URL; and
    determining the quality degradation in the cellular network if the number of DSRs in the group of DSRs is greater than a predetermined number K.

7. The system according to claim 6, wherein the multiple DSRs comprise call details records (CDRs).

8. The system according to claim 6, wherein determining the quality degradation includes assessing if the group of DSRs represents the repeated call attempts while moving between network equipment.

9. The system according to claim 6, wherein determining the quality degradation includes assessing if the group of DSRs represents the repeated call attempts and does not contain information for a specific network equipment.

10. The system according to claim 6, wherein the call quality degradation is further determined by diagnosing network equipment failure.

11. A computer program product comprising:
one or more computer-readable storage medium, wherein the computer readable storage medium is not a transitory signal per se, the one or more computer-readable storage medium having stored thereon program instructions, which when executed by one or more processors, cause the one or more processors to perform a method comprising:
receiving multiple data session records (DSRs), each DSR being an electronic data record comprising details of a telecommunications transaction on the cellular network;
identifying, by analyzing the multiple DSRs for temporal and spatial data, a group of DSRs for different users having a common attribute, the common attribute of the group of DSRs being selected from the group consisting of repeated call attempts and accessing a same URL via the cellular network, the analyzing the multiple DSRs comprising:
determining that the group of DSRs is further identified based on being associated with a common cell site according to the spatial data such that a quality degradation is determined to be at a location of the common cell site in response to the common attribute being the repeated call attempts, wherein at least a pair of DSRs from the group of DSRs has a time separation that is less than a predetermined threshold; and
determining that the group of DSRs is not geographically correlated for the different users experiencing issues accessing the same URL such that the quality degradation is determined to be external to the cellular network in response to the common attribute being accessing the same URL; and
determining the quality degradation in the cellular network if the number of DSRs in the group of DSRs is greater than a predetermined number K.

12. The computer program product according to claim 11, wherein the multiple DSRs comprise call details records (CDRs).

13. The computer program product according to claim 11, wherein determining the quality degradation includes assessing if the group of DSRs represents the repeated call attempts while moving between network equipment.

14. The computer program product according to claim 11, wherein determining the quality degradation includes assessing if the group of DSRs represents the repeated call attempts and does not contain information for a specific network equipment.

* * * * *